United States Patent [19]

Hyltin et al.

[11] 4,264,034
[45] Apr. 28, 1981

[54] DIGITAL THERMOSTAT

[76] Inventors: Tom M. Hyltin, 5733 Preston Haven, Dallas, Tex. 75230; J. Scott Jamieson, 715 Waverly Dr., Arlington, Tex. 76015

[21] Appl. No.: 67,028

[22] Filed: Aug. 16, 1979

[51] Int. Cl.³ ............................ G06F 7/38; G08B 1/00
[52] U.S. Cl. .................................... 236/46 R; 236/47; 235/92 CA; 340/309.4
[58] Field of Search ................. 236/46 R, 47; 165/12; 807/252 B; 340/309.4, 309.1; 219/492; 364/104; 235/92 CA

[56] References Cited

U.S. PATENT DOCUMENTS

| 3,677,335 | 7/1972 | Weatherston | 165/12 |
| 3,724,534 | 4/1973 | Weatherston | 165/12 |
| 3,933,197 | 1/1976 | Zimmer et al. | 236/46 R X |
| 3,942,718 | 3/1976 | Esposito et al. | 236/78 R |
| 3,974,426 | 8/1976 | Gingras | 236/47 X |
| 4,071,745 | 1/1978 | Hall | 236/46 R X |
| 4,079,366 | 3/1978 | Wong | 340/309.4 |
| 4,162,036 | 7/1979 | Balduzzi | 236/47 |
| 4,191,328 | 3/1980 | Issacs et al. | 236/46 R |
| 4,206,872 | 6/1980 | Levine | 219/492 X |

Primary Examiner—William E. Wayner

Attorney, Agent, or Firm—Hubbard, Thurman, Turner, Tucker & Glaser

[57] ABSTRACT

An energy conserving thermostatic control system having digitally implemented control functions for use with a heating and/or air conditioning system is disclosed. The digital thermostat includes an LCD data display for simultaneously displaying present time and ambient temperature. Slide switches are provided for setting and indicating set point information such as day temperature, night temperature, night-to-day transition time, and day-to-night transition time. The switch contacts of each slide switch are multiplexed to the display driver conductors for conveying time and temperature set point data during time and temperature scan intervals which alternate with a display interval. Strobe signals which are applied to the driver conductors are counted during the alternate scan intervals for selecting a day temperature different from a night temperature, for selecting the times which divide night from day and for providing set-back to night temperature during a predetermined time of the day. A day-skipper circuit inhibits set-back on selected days. A power divider circuit is provided which permits wire-for-wire substitution of the digital thermostat for a conventional electromechanical thermostat.

8 Claims, 24 Drawing Figures

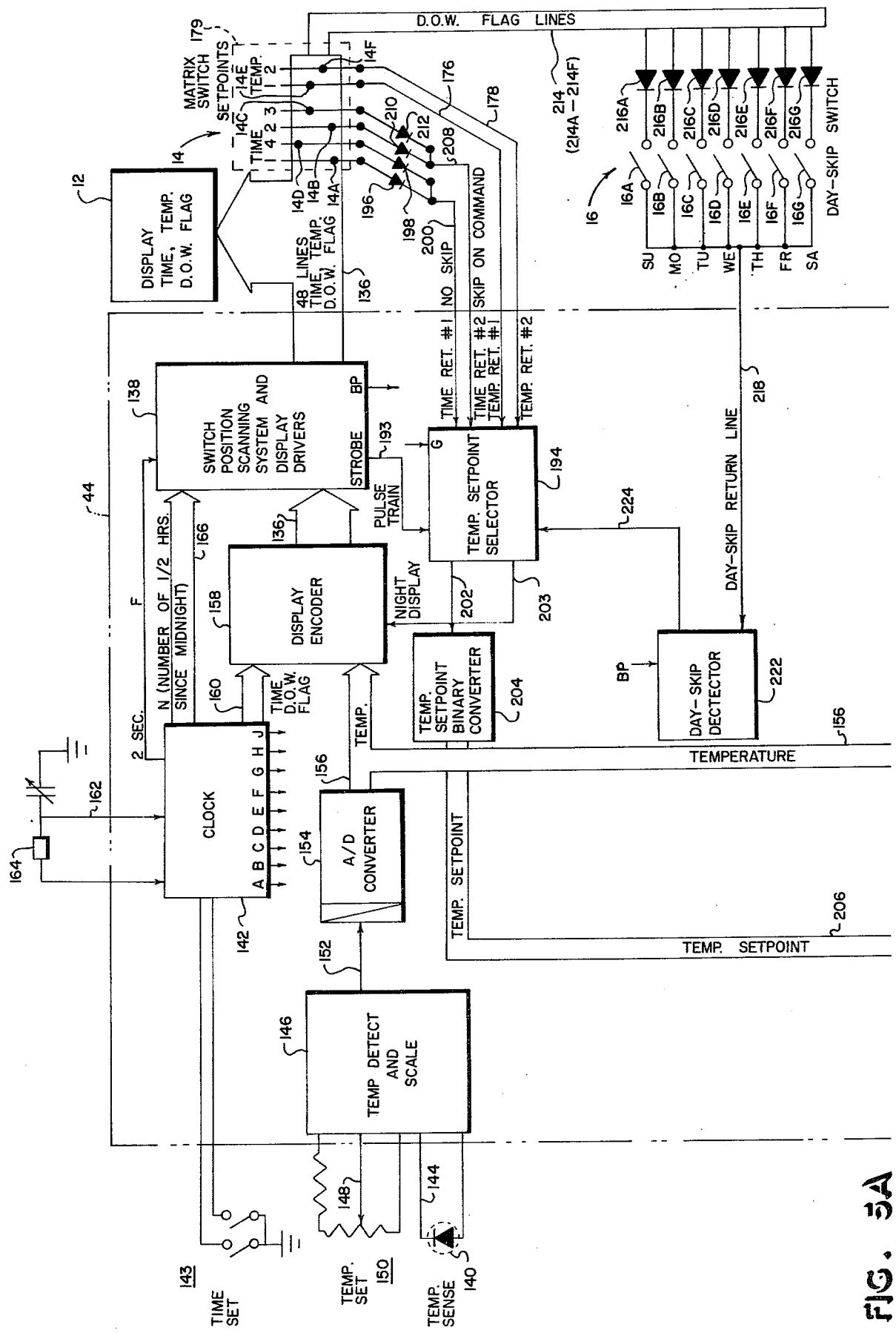

DIGITAL THERMOSTAT

BACKGROUND OF THE INVENTION

1. Field of the Invention

The present invention relates to thermostatic control systems for regulating the ambient temperature of an enclosed area such as the living space of a home or office, and in particular to a digital electronic thermostat for automatically controlling the operation of heat transfer apparatus in which the thermostat cycles the heat transfer apparatus on and off to maintain the ambient temperature within a living space at either an energy conserving temperature level or a comfort temperature level during selected periods of night and day, respectively, and at the energy conserving temperature level during selected set-back periods.

2. Description of the Prior Art

It is well known in air conditioning and heating systems to utilize a thermostat which is manually settable to a selected control temperature level for regulating the ambient temperature of a living space in a home, office or other building. Conventional thermostatic controls include electro-mechanical devices which automatically cycle the furnace, air conditioning unit and related equipment between "on" and "off" states to maintain the temperature at the selected level. Such conventional electro-mechanical thermostatic control units typically comprise a nonpowered component such as a temperature sensitive bimetal switch or a bimetal thermometer. These electro-mechanical thermostatic controls are responsive to ambient temperature and are usually installed in the low voltage control circuit of a furnace or air conditioner. The regulated temperature is determined by manually setting a set point device on the thermostatic control by which the temperature is regulated within a few degrees over a range of from about 50° F. to 90° F. The thermostatic control is typically mounted upon a centrally located wall within the dwelling or office and is coupled to the furnace or air conditioning unit by means of permanent wiring located within the wall.

For ideal comfort or for energy conservation reasons, it is common practice to reduce the degree of cooling or heating during periods of minimum activity, for example during nighttime or at other times of minimum activity, according to comfort requirements. For example, the ambient temperature in a home can be reduced significantly at night when the occupants are asleep without causing any discomfort. Additionally, the temperature can be reduced substantially during the day when the dwelling is not occupied. Such a reduction in the nighttime temperature of the dwelling is referred to as a "set-back" which results in a significant reduction in fuel consumption and heating or cooling costs for the dwelling. With the conventional electro-mechanical thermostat, such temperature set-backs have been carried out manually. The need to manually alter the regulated temperature is subject to the human failure of forgetting to change the thermostatic setting whereby cost savings are lost. Also, manual alteration of the regulated temperature is not entirely satisfactory since the dwelling will be uncomfortably cool in the morning before it is manually reset and, due to the lag time of typical heating systems, time is required for the temperature of the dwelling to rise to a comfortable level for normal daytime activities.

Automatic set-back has been provided by a conventional electromechanical thermostat arrangement for regulating room temperature at two different temperature levels in a predetermined time sequence. Such arrangements typically provide a timer for night set-back and require two separate sources of energy, one for the timer and another for the thermostat circuitry. An additional transformer or an external battery is usually provided for energizing the timer. A pair of temperature sensitive switches is also required for manually setting the two control levels. One switch is manually set to a desired day temperature and the other is manually set to a desired night temperature. The timer automatically enables one of the switches in the morning, and enables the other in the evening. The cost and need for installing an additional power circuit for conventional set-back thermostats represents a practical limitation on the use of such thermostats as a replacement for the single cycle electro-mechanical thermostat control in existing structures.

An additional limitation on the adaptation of electro-mechanical thermostat/timer combinations for regulating ambient temperature at two different temperature levels and for providing either day set-back or night set-back is the requirement of a large number of data input control circuits for manually setting time and temperature set point information. For example, a thermostatic control unit having night set-back, day set-back and day skip capability requires the following data inputs:

(a) selection of daytime temperature over a 40°–50° F. temperature range;

(b) selection of nighttime temperature over a 40°–50° F. temperature range;

(c) selection of day-to-night transition time;

(d) selection of night-to-day transition time;

(e) selection of time for initiating day set-back;

(f) selection of time for terminating day set-back;

(g) selection of day or days of the week to skip; and, (h) other special instructions such as mode selection (Cool—Off—Heat) and fan operation (On—Auto).

The number of conductors and switches required to implement the foregoing functions throughout the desired time and temperature ranges in an electro-mechanical thermostat control unit, either with or without timers, would necessarily require a large number of conductors and switches within a relatively large housing. Such information could be fed into a thermostatic controller in digital form with a keyboard input device, but to gain broad market acceptance, minimize setting errors and have all the settings apparent or intuitively obvious at all times, a "sliding bar" type of input is desirable. With such an arrangement, less operator training is required, less reliance on instruction manuals is needed, and in business operations, the settings can be determined through a clear plastic cover which may be locked over the thermostatic control unit to prevent tampering.

However, with a conventional sliding bar type of data input arrangement, to bring out the large number of conductors necessary for encoding the position of the sliding bar switches would mean that the circuit receiving the inputs would necessarily require an inordinately large capacity to be compatible with the required number of data input nodes. Therefore for domestic applications where a minimum size and appearance are important considerations, it has not been practical to implement the coventional sliding bar type arrangement, even though it provides the aesthetically pleasing, intuitively obvious indication of input setting.

OBJECTS OF THE INVENTION

The principal object of the invention is to provide an improved energy conserving thermostatic control which utilizes digital control circuits for regulating the operation of heating and/or air conditioning systems.

Another object of the invention is to provide a digital thermostatic control which will automatically regulate the temperature of a home or office at a selected night temperature and at a selected day temperature during predetermined times of night and day, respectively.

Yet another object of the invention is to provide such a digital thermostatic control which will automatically cycle heat transfer apparatus on and off to maintain a regulated comfort temperature level in a controlled area during predetermined periods of normal activity and for maintaining the temperature of the controlled area at an energy conserving level during periods when the controlled area is not occupied or during periods of minimum activity such as at night.

Still another object of the invention is to provide such a digital thermostatic control which is capable of automatically regulating the temperature of a controlled area at a comfort temperature level and at an energy conservation level at selected times of each day of the week and which is programmable to maintain the temperature of the controlled area at the energy conservation level without reverting to the comfort level during selected days of the week.

Another object of the invention is to provide such a digital thermostatic control which will regulate the temperature in a controlled area in a dual cycle mode of operation in which the temperature is set back to an energy conserving level during a predetermined nighttime interval and during a predetermined daytime interval, with the temperature of the controlled area being regulated at a comfort level during activity intervals preceding and following the day set-back interval.

Yet another object of the invention is to provide such a digital thermostatic control which can be used for automatically regulating the temperature of the controlled area at either a comfort temperature level or an energy conservation level in combination with both heating and air conditioning systems.

Still another object of the invention is to provide such a digital thermostatic control which may be substituted for a conventional electro-mechanical thermostatic control without modification of the heat transfer apparatus.

Another object of the invention is to provide such a digital thermostatic control which consumes a minimum of power and which derives its operating power from available power conductors without interfering with or being affected by operation of the heating or air conditioning equipment powered from the circuit from which the thermostat power is derived.

Another object of the invention is to provide such a digital thermostatic control which includes an array of slide switches having contacts which are multiplexed with existing conductors for inputting and indicating time and temperature set point data.

SUMMARY OF THE INVENTION

According to broad aspects of the invention, an energy conserving thermostatic control system utilizes digital control circuits for regulating the operation of heating and/or air conditioning systems for maintaining the ambient temperature of a controlled area at a selected night temperature and at a selected day temperature during predetermined times of night and day, respectively. The digital thermostat includes a digital display for simultaneously displaying present time and ambient temperature. Slide switches are provided for setting and indicating set point information such as day temperature, night temperature, night-to-day transition time, and day-to-night transition time. The switch contacts of the slide switch are multiplexed to the digital data display driver conductors for conveying time and temperature set point data during alternate time and temperature scan intervals.

The driver conductors and switch assemblies define a matrix of columns and rows formed by the driver conductors and switch conductors, respectively. The switch conductors are movable into engagement with each of the driver conductors for establishing a number of data set points for each data function, for example night temperature, day temperature, night-to-day transition time and day-to-night transition time. Resolution of each time or temperature function within a specified range is proportional to a number of driver conductors of the matrix. For example, for a time range of twenty-four hours an array of forty-eight driver conductors provides one-half hour time interval resolution. The position of each movable switch element is manually settable from one driver conductor to another whereby set point information can be manually input and adjusted as desired.

The position of each set point switch is determined by applying strobe signals to the driver conductors during scan intervals. Strobe signals which are applied to the driver conductors are counted during alternate scan intervals for selecting a day temperature different from a night temperature, and for selecting the times which divide night from day and for providing set-back to night temperature during a predetermined time of the day. A day skipper circuit provides skipping of selected days on single cycle operation and prevents daytime set-back on selected days during dual cycle operation, as desired.

According to an important feature of the invention, control means are coupled to the digital data display for periodically applying present time and ambient temperature data signals to the digital data display during a display interval and for interrupting the data signals during scan intervals preceding and following the display interval. The driver conductors are strobed to determine time set point information during the preceding scan interval and are strobed again to determine temperature set point information during the following scan interval. Data return conductors are coupled to each of the set point switches for conducting a return pulse when the driver conductor to which it is connected receives a strobe pulse.

The occurence of a time transition from night-to-day or from day-to-night is determined by a first counting circuit which is coupled to first and second time set point data return conductors for counting the number of strobe pulse return signals conducted through the time set point data return conductors during the time set point scan interval commencing with the first application of a strobe pulse to a driver conductor and terminating upon the application of the Nth sequential strobe pulse to a driver conductor, N being the number of present time resolution intervals elapsed since a predetermined reference time.

In a preferred embodiment, two slide switch assemblies including set point data return conductors are provided wherein the position of each switch assembly is representative of the night-to-day transition time and the day-to-night transition time, respectively. A counter generates a digital data word representative of the number of present half-hour intervals which have elapsed since midnight. Another counter counts the number of data return signals conducted through the data return signals during the application of the first N strobe pulses to the driver conductors. The number of data return pulses will either be an odd number or an even number, and if it is an odd number a night-to-day transition is indicated, and if it is an even number a day-to-night transition is indicated.

During the second scan interval the driver conductors are pulsed to determine day temperature and night temperature set point levels. Two slide switch assemblies including temperature set point data return conductors are coupled to the driver conductors for setting the night and day temperature levels, respectively. A counting circuit is coupled to the temperature set point data return conductors and to the first counting circuit for generating a temperature set point digital data word representative of the number of strobe pulses counted which occur during the temperature set point scan interval commencing with the first application of a strobe pulse to a driver conductor and terminating with the application of a strobe pulse to the driver conductor engaged in electrical contact with the day temperature return conductor in response to a count during the time scan indicating the occurrence of a night-to-day transition, or to the driver conductor engaged in electrical contact with the night temperature data return conductor in response to a time scan count indicating the occurrence of a day-to-night transition. The digital data word representative of either the day temperature or night temperature set point is compared with a digital data word representative of the ambient temperature for cycling the heat transfer apparatus on or off in response to a predetermined comparative relation of the ambient and set point data words which is a function of the selected mode (Heat or Cool).

The digital thermostatic control unit is adapted for use with a heating or cooling system which includes a source of operating power characterized by an alternating current waveform and a system control relay connected in series of electrical relation therewith without interfering with the operation of the heating or cooling system. Operating power for energizing the digital thermostatic control is provided by a power divider circuit for energizing or de-energizing the system control relay in response to the presence and absence of a command signal from the thermostatic control unit, respectively, and for providing a continuous source of operating power for the thermostatic control unit without interfering with the operating state of the system control relay.

In a preferred embodiment of the power divider circuit, a semiconductor switch is provided which includes a gate controlled conductive path through which conduction is initiated by a gate signal and is sustained by either forward or reverse current flow through the conductive path within a certain holding current threshold level and interrupted by an excursion of the alternating current waveform outside of the holding current threshold level. A power converter circuit is connected in parallel electrical relation with the gate controlled conductive path for continuously developing regulated direct current power either in response to the conduction of current from the system control relay during a full cycle of the alternating current waveform or in response to the conduction of current from the system control relay through the converter circuit during only a fraction of a cycle of the alternating current waveform. A sync detector circuit is coupled to the switch for generating an output pulse in response to a zero cross-over of the source alternating current waveform and a gate control circuit is coupled to the switch for producing a delayed gate signal in response to the sync output pulse and for conducting the delayed gate signal through the gate of the switch in response to the presence of the command signal.

According to this arrangement, the conductive path is maintained in the open circuit condition during the absence of the command signal and during the interval commencing with the turn-off of the semiconductor switch responsive to an excursion of the source current waveform outside of the holding current threshold level and terminating with the initiation of conduction in the switch in response to the application of a delayed gate signal to the gate of the switch. In the absence of a command signal, that is when the control relay is not energized, current is conducted through the system control relay and through the power converter circuit at a level which will not cause inadvertent operation of the system control relay. During the presence of a command signal, that is when the system control relay is energized, current is conducted through the power converter circuit for only a fraction of the source waveform cycle at a power level which is not large enough to cause an unacceptable voltage drop in series with the system control relay.

The foregoing and other objects, advantages and features of the invention will hereinafter appear, and for purposes of illustration, but not of limitation, an exemplary embodiment of the subject invention is shown in the appended drawing.

BRIEF DESCRIPTION OF THE DRAWING

FIGS. 5A and 5B are simplified block diagrams of an integrated circuit which implements the logic and counting functions for carrying out the objects of the invention;

DESCRIPTION OF THE PREFERRED EMBODIMENT

Figure 1:
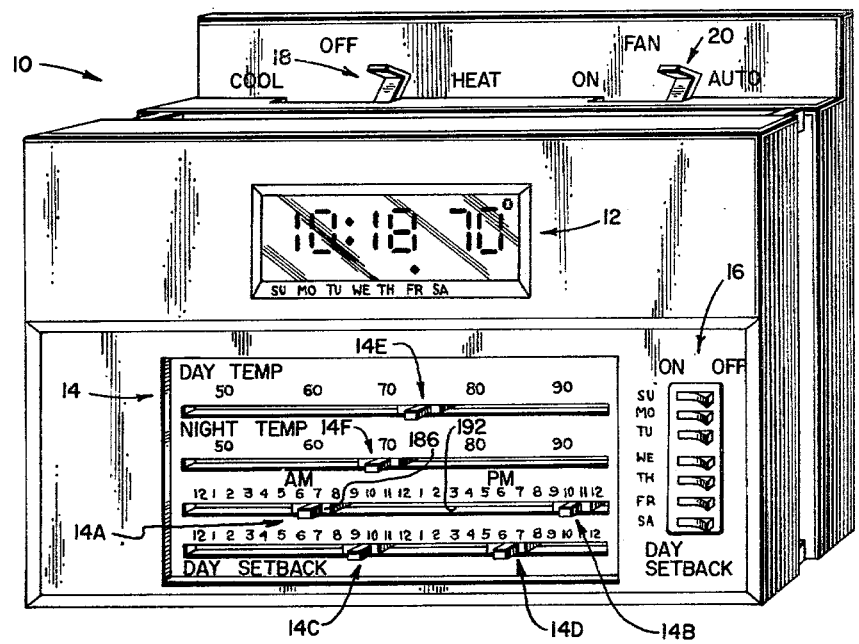
FIG. 1 is a perspective view of a digital thermostat control which incorporates the invention.

In the description which follows, like parts are marked throughout the specification and all figures of the drawing with the same reference numerals, respectively. The drawings are not necessarily to scale and in some instances portions have been exaggerated in order to more clearly depict certain features of the invention.

Referring now to the drawings there is shown in FIG. 1 an energy conserving thermostatic control 10 having digitally implemented control functions for use with a heating and/or air conditioning system. The digital thermostat 10 includes an LCD data display 12 for simultaneously displaying present time and ambient temperature. A slide switch assembly 14 is provided for setting and indicating set point information such as day temperature, night temperature, night-to-day transition time, and day-to-night transition time. A day skip switch assembly 16 includes a separate switch for each day of the week for inhibiting night set-back on selected days during single cycle operation and for inhibiting day set-back on selected days during dual cycle operation. The digital thermostat 10 also includes a mode switch assembly 18 for manually selecting Cool-Off-Heat modes of operation. Also provided is a fan switch 20 for manually setting On-Auto modes for fan operation.

Figure 2:
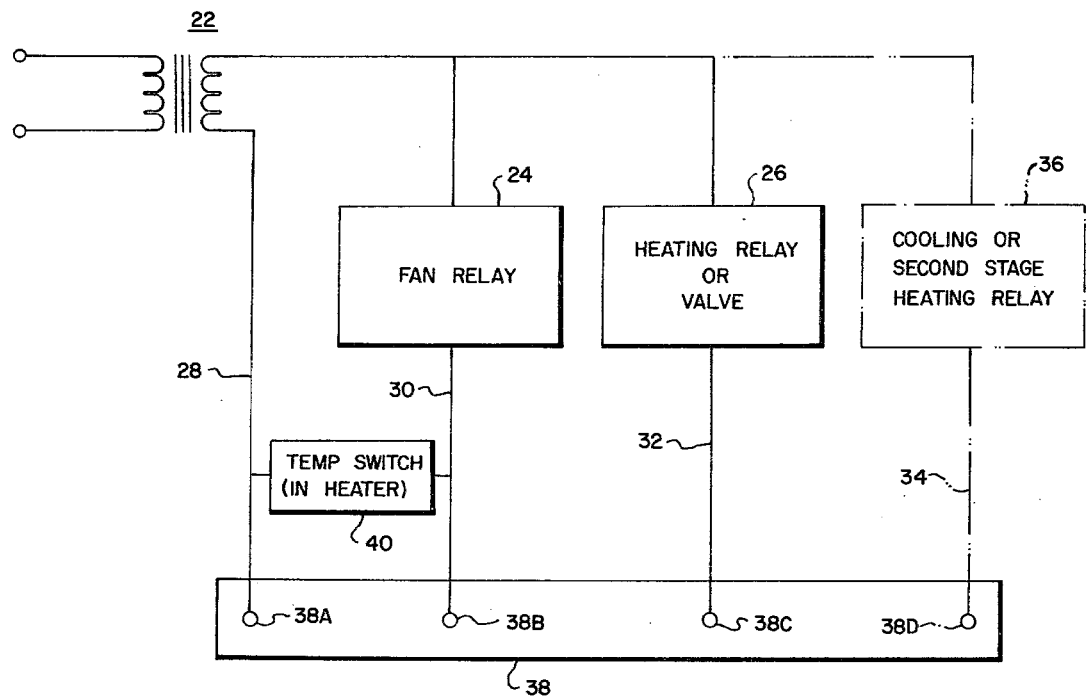
FIG. 2 is a block diagram which illustrates a conventional wiring arrangement for a home heating system.
Figure 4:
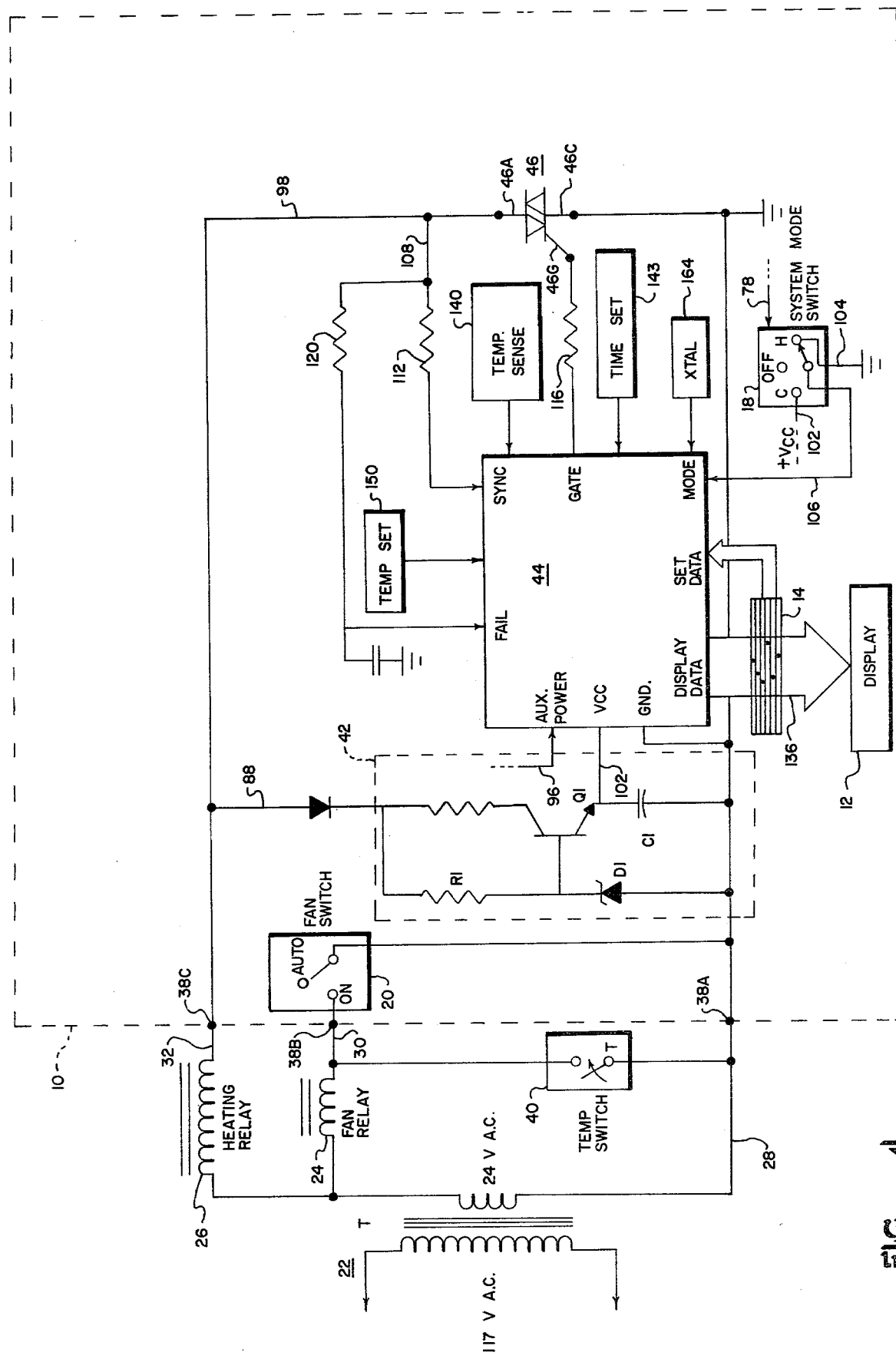
FIG. 4 illustrates a power dividing circuit which energizes the digital thermostat control of FIG. 1 by power derived from the existing heating relay circuit of FIG. 3.

The digital thermostat 10 is adapted for operation in combination with a conventional heating system which includes a low voltage power supply, typically twenty-four volts AC which is supplied by a voltage step down transformer 22 having wiring connections as shown in FIGS. 2 and 4. The step down transformer 22 converts energy from either 110 or 220 volts to approximately twenty-four volts required for a conventional thermostat operation. A fan relay 24 and a heating relay or valve 26 are connected to one side of the transformer 22 with the other side of the transformer leading to the thermostat location. The voltage step down transformer, fan relay and heating relay are typically located adjacent to furnace or cooling unit and are not accessible at the thermostat location. Conductors 28, 30 and 32 lead from the transformer 22, fan relay 24 and heating relay 26, respectively, and are brought out at the thermostat wall location for connection to the thermostat. In most installations a conductor 34 is provided for connecting a cooling or second stage heating relay 36 to the thermostat. In the usual installation, the various conductors are secured to terminal connectors 38A-38D on a back plate portion 38 of the thermostat.

The function of the conventional thermostat is to simply close a circuit between the tranformer conductor 28 and the conductor leading to the appropriate relay as determined by the setting of the system mode switch. According to the U.S. standard for thermostat wiring, a non-dedicated line for providing twenty-four volts from the step down transformer is not available in the usual thermostat installation. The problem of deriving operating power for the thermostat is compounded by the presence of a thermally controlled switch 40 on the fan circuit which is usually provided in heating units for cycling the fan on and off automatically when the furnace has reached operating temperature. Operation of the temperature switch eliminates the fan relay conductor 30 for deriving thermostat operating power since when the temperature switch is closed the voltage at terminal 38B relative to terminal 38A is zero. Thus for most installations only the conductor 32 leading from the heating relay or valve 26 is available for supplying power to the thermostat control. In such installations, the current that can be drawn through the relay without causing it to switch may be as low as one milliampere, and a voltage drop in series with the relay or solenoid of more than one volt may cause unsatisfactory operation of that relay.

Referring now to FIG. 4, a power divider circuit is provided for supplying a continuous source of regulated operating power for the thermostat 10 which includes a power converter circuit 42, a thermostat control module 44, and a semiconductor switch 46.

The semiconductor switch 46 is preferably a Triac switch of the type characterized by a holding current threshold level and having a gate 46G and nominal anode and cathode terminals 46A, 46C, respectively, which are connected in series of electrical relation with the heating relay 26 and the ground conductor 28 of the step down transformer 22. Triac is a trademark of the General Electric Company for a gate-controlled semiconductor switch designed for alternating-current power control. The semiconductor switch 46 is characterized by a holding current threshold level and a controlled conductive path through which conduction is initiated by a gate signal (Ig), sustained by forward or reverse current flow through the conductive path within the holding current threshold level, and interrupted by an excursion of the alternating current waveform outside of the holding current threshold level.

The power converter circuit 42 is connected in parallel electrical relation with the switch 46 for continuously developing regulated direct current power either in response to the conduction of current through the heating relay 26 during a full cycle of the alternating current waveform or in response to the conduction of current from the relay circuit through the converter circuit during only a fraction of a cycle of the alternating current waveform. This is carried out by charging a capacitor Cl during positive half cycles of the alternating current waveform impressed across the semiconductor switch 46. The capacitor Cl is connected between the emitter of an NPN transistor Q1 having a base to emitter junction biased by a zenor diode Dl which turns Q1 off during negative excursions of the alternating current waveform and which clamps the base to emitter junction of Q1 at a substantially constant voltage level during positive half cycles of the source alternating current waveform. Thus the voltage appearing across the capacitor C1 is maintained substantially at the avalanche breakdown voltage of the Zener diode D1 less the base to emitter voltage drop of Q1. Q1, D1 and a biasing resistor R1 are selected for providing an operating voltage $V_{cc}$ of approximately +5 volts DC.

Figure 6A:
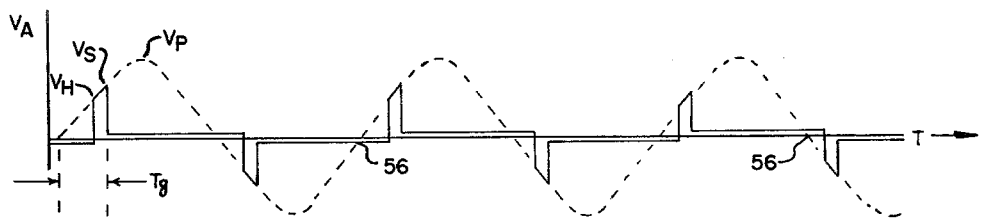
FIGS. 6A and 6B are waveforms which graphically illustrate operation of the power divider circuit of the invention.
Figure 6B:
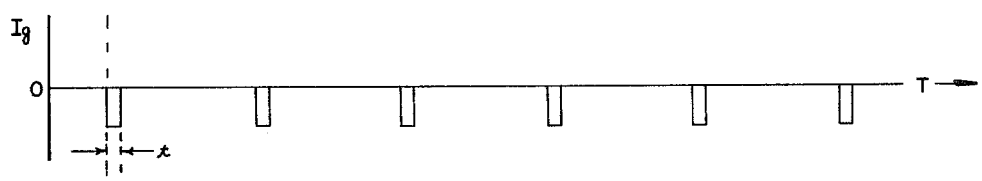
Figure 5B:
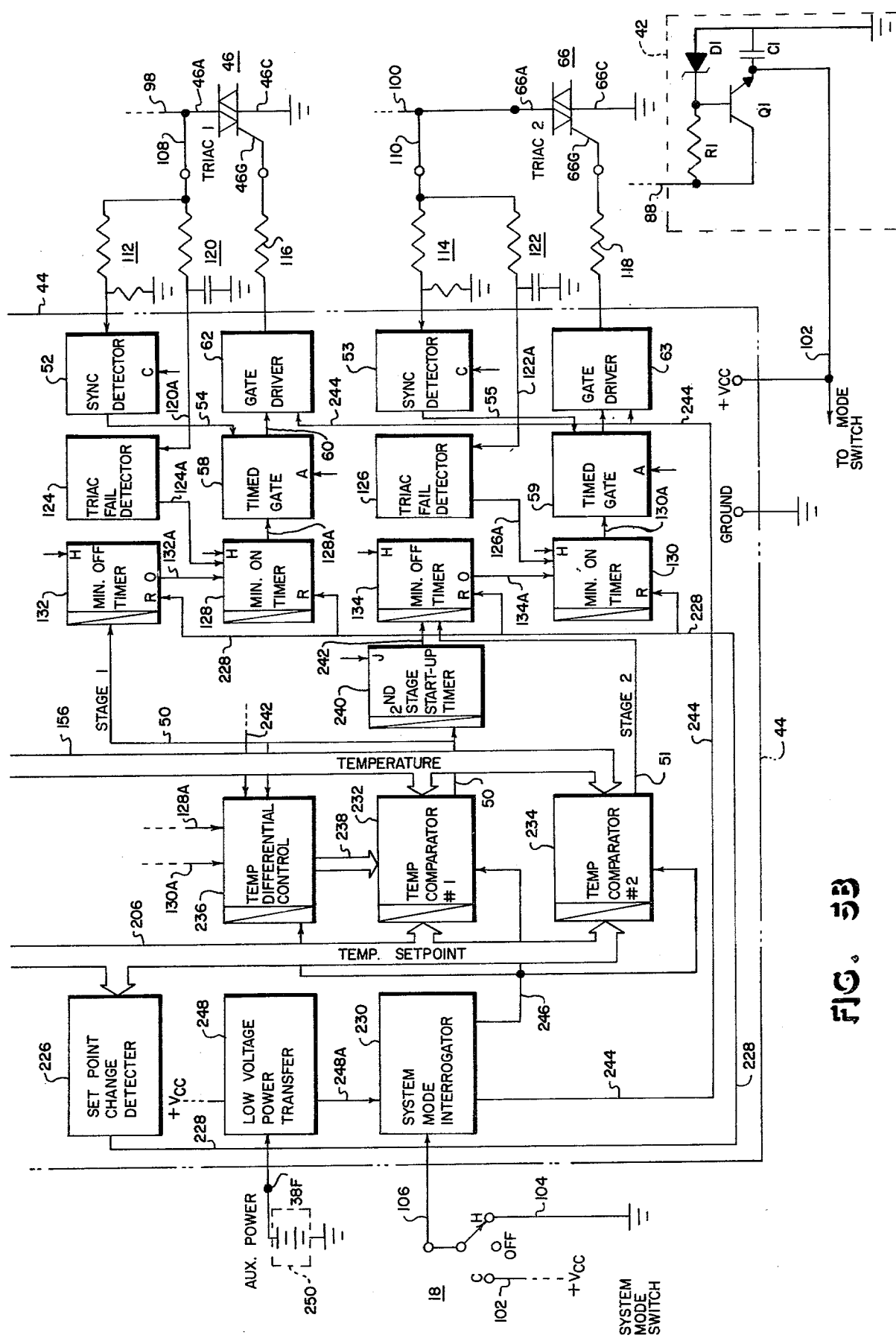

Referring now to FIGS. 5B, 6A and 6B, a command signal 50 is generated for energizing the heating relay 26. In the absence of the command signal 50, that is when the control relay 26 is not energized, full cycle current can be conducted through the system control relay and through the power converter circuit at a level which will not cause inadvertent operation of the relay. However during the presence of the command signal, that is when the system control relay 26 is energized, it is important that the current conducted through the power converter circuit be limited to a power level which is not large enough to cause an unacceptable voltage drop in series with the relay 26. This is carried out by turning the Triac switch 46 off for a very short interval during each half cycle of the alternating current waveform so that a limited amount of power can be converted from the relay circuit through the power converter 42. The resulting voltage spike is rectifed and regulated by the power converter 42 for supplying power to the thermostat 10 during periods when the heating relay 26 is energized. The circuit for carrying out this function utilizes the ability of the Triac switch 46 to turn itself off automatically in response to excurions of the alternating current waveform $V_A$ beyond a holding current threshold which corresponds to a voltage $V_H$ as shown in FIG. 6A. When the threshold level is exceeded, the conductive path through the Triac switch 46 is interrupted and the full alternating current waveform of $V_A$ appears across the nominal anode terminal 46B of the Triac switch until it is turned back on by a gate signal Ig as shown in FIG. 6B. Application of the gate signal Ig is delayed by an interval $T_\delta$ whereupon the Triac switch 46 is driven into full conduction again thereby defining a voltage spike having a peak voltage $V_S$. A sync detector circuit 52 is coupled to the Triac switch 46 for generating an output pulse 54 in response to a zero crossover of the source alternating current waveform $V_A$. A timed gate circuit 58 produces a delayed gate signal 60 for enabling a gate driver 62 which conducts the gate signal Ig having a duration $\tau$ through the gate terminal 46A.

According to the foregoing arrangement, the conductive path through the Triac switch 46 is maintained in the open circuit condition during the absence of the command signal 50 and during the interval commencing with the turn-off of the Triac switch 46 responsive to an excursion of the source current waveform $V_A$ outside of the holding current threshold level and terminating with the initiation of conduction in response to the application of the delayed gate signal Ig. By carefully controlling the duration of the delay interval $T_\delta$, the effective load current diverted through the power converter 42 can be reduced to a level approaching zero which is sufficient for providing operating power for the control module but which is not large enough to cause an unacceptable voltage drop in series with the system control relay 26.

A typical multiple mode heating and cooling installation will include at least one stage of heating, one stage of cooling and will sometimes include a second stage heating unit. In such installations one control line or the other is available at all times for conducting the source alternating current waveform from which regulated operating power is derived by the power converter 42. In this arrangement it is not necessary to "steal" or divert operating power during a fraction of the source waveform cycle because of the availability of the additional control conductor. The current load requirements of the power conductor 42 and control module 44 are less than one milliampere at five volts so that inadvertent switching of the control relay associated with the inactive control line will not occur.

Figure 3:
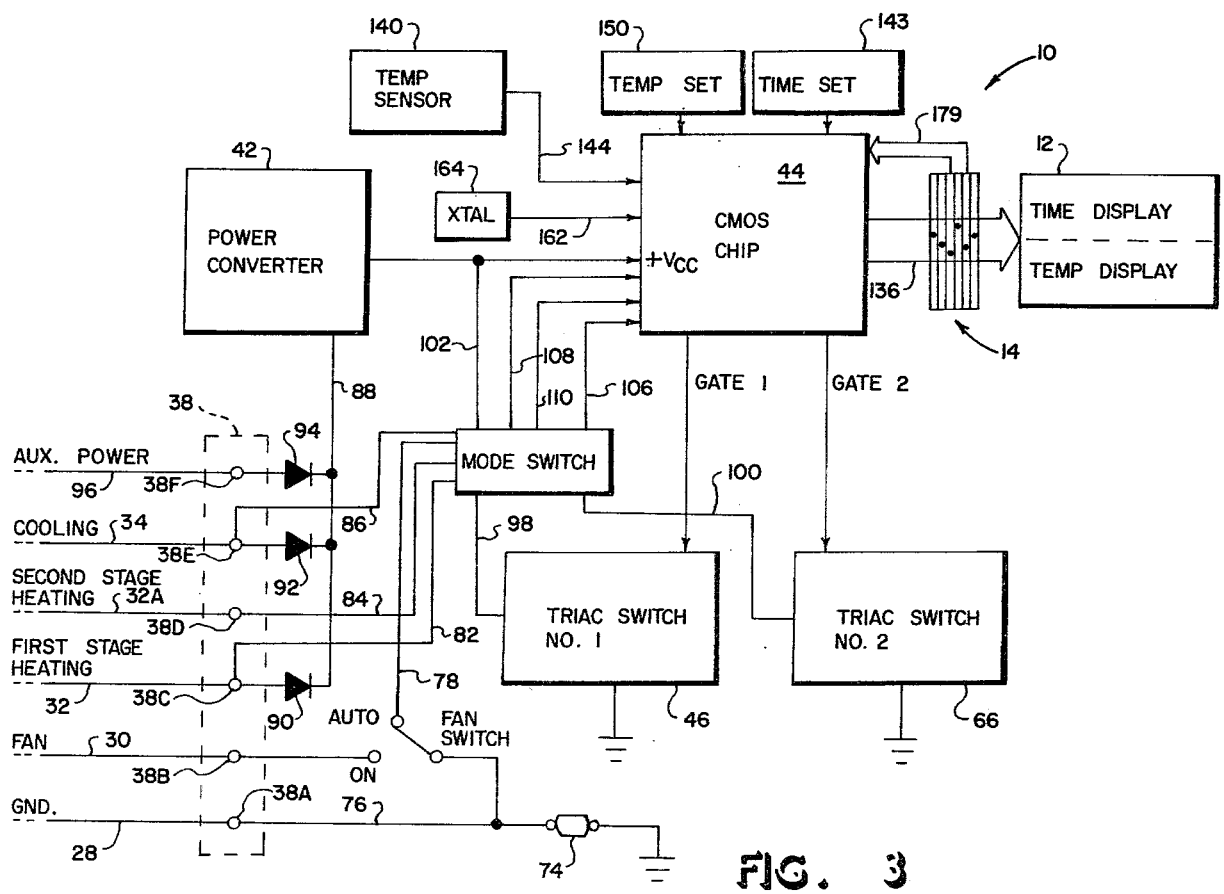
FIG. 3 is a simplified block diagram of the digital thermostat control shown in FIG. 1.
Figure 12:
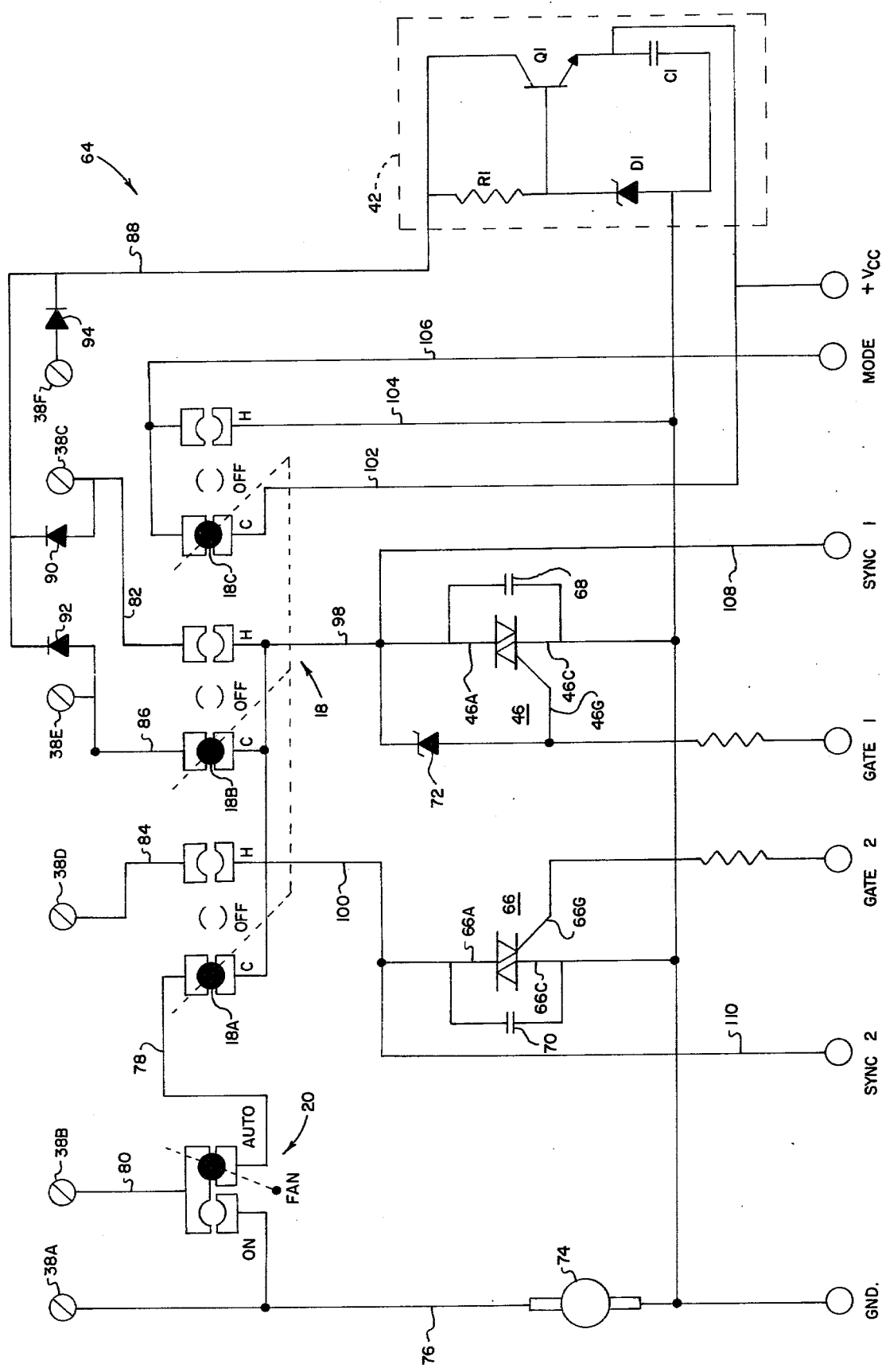
FIG. 12 is a wiring diagram of a protective switching circuit for coupling the digital thermostat of the invention to the existing wiring of a home heating and air conditioning system which features first and second stage heating modes and a cooling mode of operation.

A switching circuit 64 for accommodating a multiple mode heating/cooling system is illustrated in FIGS. 3 and 12 of the drawing. In this arrangement additional terminal connectors 38D, 38E and 38F are provided for conducting second stage heating, cooling and auxiliary power signals, respectively. In this arrangement, the mode selector switch 18 is a single pole triple throw rotary switch. The Triac switch 46 is selectively coupled through the mode switch 18 for controllably switching either the first stage heating unit or the cooling unit. Since power division is not required when the multiple mode switching circuit 64 is utilized, the triac switch 46 is preferably continuously gated in response to the command signal 50. An additional Triac switch 66 is provided for controllably switching a second stage heating relay in response to the command signal 50 and an appropriate gate signal.

RFI suppressor capacitors 68, 70 are shunted across each of the Triac switches 46, 66, respectively, for shunting radio frequency transient signals to ground in the conventional manner. A surge protector Zenor diode 72 is connected across the anode and gate terminals of the Triac switch 46 for limiting the build-up of voltage across the Triac switch in response to a transient or line surge in the source alternating current waveform. An ambient over temperature protector 74 is provided for opening the ground conductor 76. The ambient over temperature protector switch is preferably selected to open at 100° F. in the event the thermostat 10 fails in the heat mode.

The fan switch 20 is electrically coupled to the mode selector switch 18 through a conductor 78 which permits the fan to be cycled on and off in response to operation of either the heating relay or the cooling relay. Blocking diodes 90, 92 and 94 provide alternate conductive paths from the first stage heating conductor 32, cooling conductor 34 and auxiliary power conductor 96, respectively, for supplying alternating current power through the auxiliary power conductor 88 to the power converter 42. A conductive path is established between the appropriate system control relay and Triac switch through the contactor elements 18A, 18B and 18C and through the corresponding control conductors 98, 100, 102, 104 and 106. Conductors 108, 110 are connected to the nominal anode terminals of Triac switches 46, 66, respectively, for conducting the source alternating current waveform to the sync detectors in which zero crossover is detected as previously discussed.

Referring now to FIG. 5A, the interface connections between the system mode switch 18, power converter 42 and Triac switches 46, 66 are illustrated. Current divider networks 112, 114 couple the source alternating current waveform from the corresponding sync conductors 108, 110, respectively. Current limiting resistors 116 and 118 conduct delayed gate signals Ig through the gates 46G and 66G, respectively. RC filter assemblies 120, 122 produce a step output signal 120A and 122A, respectively, in response to a failure of the Triac switch in a half wave condition. The Triac fail signals 120A, 122A are received by Triac fail detectors 124 and 126, respectively. The Triac fail detectors generate gate turn-on signals 124A and 126A, respectively, for causing the gate driver associated with the failed Triac switch to gate the Triac switch on so that current flow will be symmetrical through the system control relay load. The gate turn-on signals 124A, 126A are coupled through minimum-on timer circuits 128, 130, respectively, and through the timed gate circuits 58, 59, respectively. Associated with each minimum-on timer is a minimum-off timer 132, 134, respectively, for maintaining each stage in an off condition for a minimum programmed interval under certain conditions. The minimum-on timers maintain each stage in an on condition for at least a programmed interval. As a result of cooperation between the minimum-on timers and minimum-off timers, servo hunting in response to slight ambient temperature variations is minimized, and it guarantees that certain heat transfer equipment will remain on for a minimum length of time after initial turn-on according to design requirements.

The development of stage one and stage two command signals 50, 51 will now be discussed in connection with FIG. 5A and FIG. 5B. Generation of the command signals is coordinated with time and temperature set point information as determined by the position of movable switch conductors 14A–14F. The movable switches are selectively engaged with selected driver conductors of a driver conductor array 136 which interconnects a switch position scanning and display driver system 138 to the LCD display unit 12. Reference temperature and time information are provided by a temperature responsive transducer 140 and a count clock 142, respectively. The temperature transducer 140 produces an analog signal 144 which is proportional to the ambient temperature of the controlled area.

The analog temperature signal 144 is compared by a temperature detector unit 146 with a calibration signal 148 developed by a calibration potentiometer 150. The output of the temperature detector 146 is a scaled and calibrated analog signal 152 which is converted into a binary digital data word by an analog to digital converter 154. The binary data word is conducted through an ambient temperature data bus 156 which forms one input of a display encoder 158. A second input of the display encoder is formed by a clock data bus 160 through which binary data words representative of present time and day of week are conveyed. The display encoder converts the time, temperature and day of week flag words to the appropriate form for alphanumeric display. The output of the display encoder 158 is coupled to the switch position scanning and display driver system 138 through the driver conductors K1–K48 which comprise the driver conductor array 136.

Figure 9:
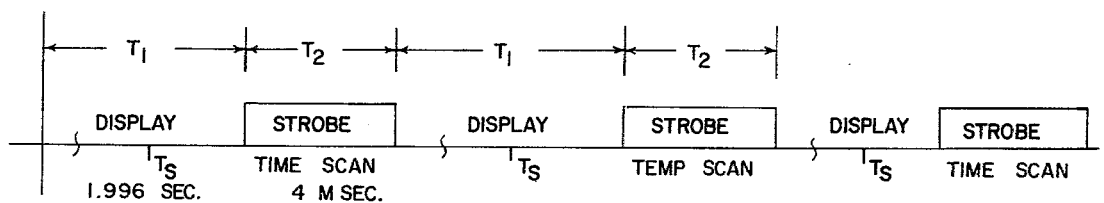
FIG. 9 illustrates the alternation of time scan and temperature scan intervals with display intervals.

According to the important feature of the invention, the driver conductors of the array 136 are multiplexed for conveying time and temperature set point data during alternate scan intervals as well as for conveying the display signals during display intervals as illustrated in FIG. 9. Operation of the switch position scanning and display driver system 138 is described in detail in copending U.S. application Ser. No. 057,166, filed July 13, 1979, and assigned to the assignee of the present invention, said copending application being hereby incorporated by reference.

Figure 8:
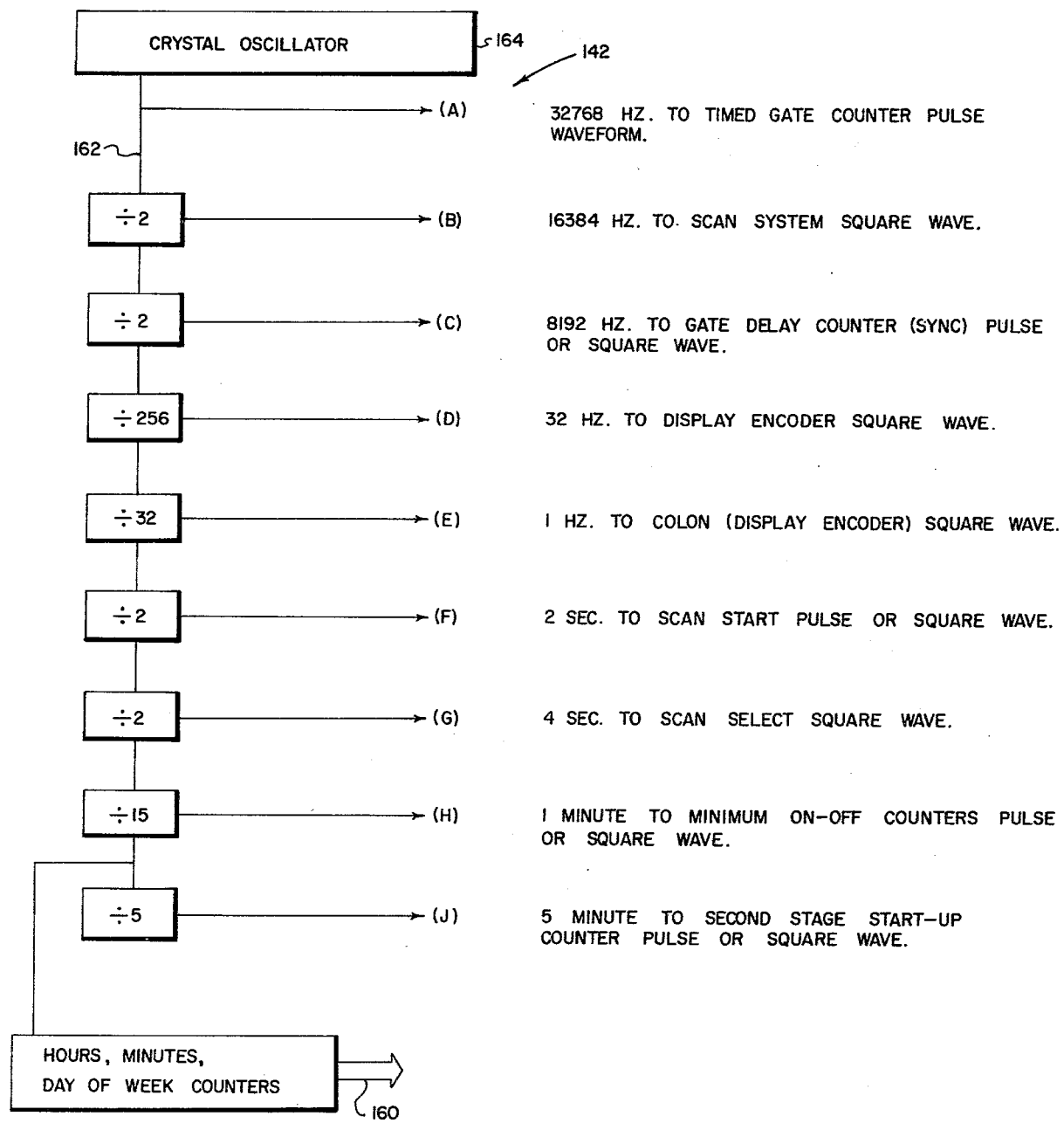
FIG. 8 is a block diagram which identifies the timing signals which are developed by the clock shown in FIG. 5B.

The clock 142 is a counter which counts down the output signal 162 of a piezoelectric crystal 164 having a resonant frequency of 32.768 khz. All counting, scanning and delay functions are based on various clock pulse counting signals as identified in FIG. 8. As previously discussed, the clock counter 142 provides binary data words corresponding to present hours, minutes and day of week flag through the clock data bus 160. The clock 142 also generates a binary coded data word representative of the number of N of the present half hour intervals elapsed since a predetermined reference time, for example midnight. The coded word representative of N is conveyed through a separate clock data bus 166 which forms one input of the switch position scanning and display driver system 138. This information is used for determining the occurrence of a night-to-day transition or a day-to-night transition as will be discussed in detail below.

Referring now to FIG. 5A, FIG. 10, FIG. 11 and FIG. 13, the driver conductor array 136 and slide switch assembly 14 define a matrix of columns and rows formed by the individual driver conductors K1–K48 and by time and temperature data return conductors 168, 170, 174, 176 and 178, the data return conductors collectively defining a return data bus 179. The switch conductors are movable into engagement with each of the driver conductors for establishing a number of data set points for each data function including night-to-day transition time, day-to-night transition time, day set-back initiation time, day set-back termination time, day temperature level and night temperature level, respectively. Resolution of each time and temperature function within a specified time or temperature range is proportional to the number of driver conductors within the array 136. In a preferred embodiment, there are 48 driver conductors which provide one-half hour time interval resolution over a twenty-four hour range and one degree (1° F.) resolution over a forty-eight degree range (48° F.–96° F.).

Figure 10:
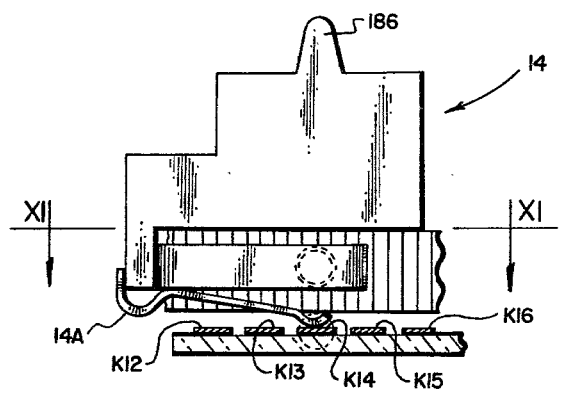
FIG. 10 is an elevation view, partly in section, of a portion of a slide switch shown in the digital thermostat of FIG. 1.
Figure 11:
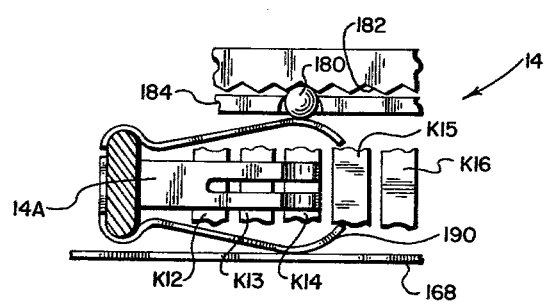
FIG. 11 is a view of the slide switch of FIG. 3 taken along the line XI—XI of FIG. IV.

The position of each movable switch element 14A–14E is manually settable from one driver conductor to another whereby the set point information can be manually input and adjusted as desired. As can be seen in FIGS. 10 and 11, switch contact 14A is a wiper arm which is selectively engagable with each of the driver conductors K1–K48.

Figure 13:
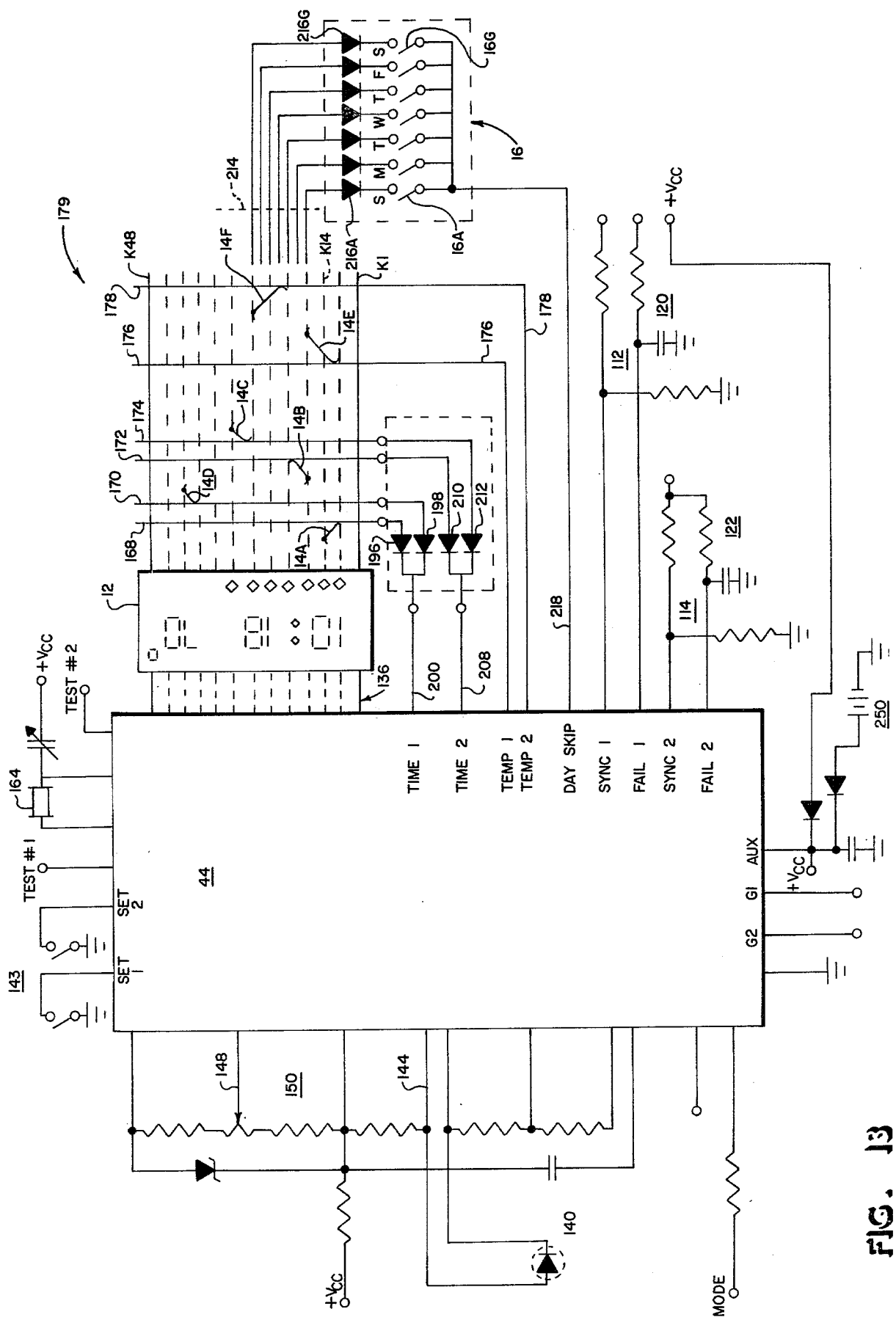
FIG. 13 is a combination block diagram and circuit diagram which illustrates the principal external connections for a control module equipped for dual cycle operation.

The position of each slide switch assembly is adjustable with the curved portion of the conductive wiper arm 14A being movable from conductor to conductor within the driver conductor array 136. The position of the switch assembly 14A is determined by the location of a roller ball 180 which is displaced and lodged within adjacent detents 182 as a carriage member 184 in which the roller ball is confined is displaced by means of a slide switch handle 186. The roller ball 180 is further confined by a spring clip 188 with which it is resiliently engaged at all times. According to this arrangement, an electrically conductive path is established from the driver conductor K14 through the conductive curved portion of the wiper arm 14A which is joined in electrical contact with a second wiper arm 190. The wiper arm 190 has a curved conductive portion resiliently engaged in electrical contact with the night-to-day data return conductor 168 as can be seen in FIG. 13. Thus it will be apparent that as the slide switch handle 186 is moved through a slot 192 formed in the face of the slide switch assembly 14 that a discrete electrical contact can be made with each of the driver conductors K1-K48 as they are engaged one by one by the wiper arm 14A.

According to an important feature of the invention, the switch position scanning and display driver system 138 is coupled to the driver conductor array 136 for periodically applying present time and ambient temperature data signals to the data display 12 during a display interval T1 having a duration of 1.996 seconds as shown in FIG. 9. The data display signals are interrupted during very short scan intervals T2 preceding and following the display interval. The scan intervals are relatively short in duration, preferably 4 milliseconds. The driver conductors K1-K48 of the array 136 are strobed with strobe pulses of relatively short duration to determine time set point information during the preceding scan interval and are strobed again to determine temperature set point information during the following scan interval. The strobe pulses are developed by the clock 142 and appear as a square wave pulse train having a frequency of 16.384 khz (Clock Output B). The data return conductors 168, 170, 172, 174, 176 and 178 transmit a return pulse when the driver conductor to which it is connected receives a strobe pulse.

The occurrence of a time transition from night-to-day or from day-to-night is determined by counting the number of strobe pulse return signals conducted through the time set point data return conductors 168, 170 during the time set point scan interval commencing with the first application of a strobe pulse to a driver conductor and terminating upon the application of the Nth sequential strobe pulse to a driver conductor, where N is the number of present time resolution intervals elapsed since the reference time as determined by the clock 142.

The positions of the two slide switch assemblies 14A, 14D are representative of the night-to-day transition time and the day-to-night transition time, respectively. A counter in the temperature set point selector 194 counts the number of data return signals conducted through diodes 196, 198 which are attached in common to a time return line 200. The number of data return pulses will either be an odd or an even number, and if it is an odd number a night-to-day transition is indicated, with an even number count indicating a day-to-night transition.

During the second scan interval the driver conductors K1-K48 are strobed to determine day temperature and night temperature set point levels. Two slide switch assemblies 14E and 14F including a day temperature return conductor 176 and a night temperature return conductor 178 are coupled to the driver conductors for setting the day and night temperature levels, respectively. A counting circuit in the temperature set point converter 204 is coupled to the temperature set point data return conductors and to the first counting circuit for generating a temperature set point digital data word representative of the number of strobe pulses conducted through the pulse train conductor 193 which occur during the temperature set point scan interval T2 commencing with the first application of a strobe pulse to a driver conductor, for example driver conductor K1 (FIG. 13), and terminating with the application of a strobe pulse to the driver conductor engaged in electrical contact with the day temperature return conductor 176 in response to a count during the previous time scan indicating the occurrence of a night-to-day transition, or to the driver conductor engaged in electrical contact with the night temperature data return conductor 178 in response to a time scan count indicating the occurrence of a day-to-night transition.

The temperature set point selector 194 has two outputs: first a temperature set point data gate signal 202 which starts and stops the binary converter counter 204 in response to a return pulse through either the day temperature return line or the night temperature return line, and a day/night signal 203 which forms one input of the display encoder 158. The temperature set point data gate signal 202 forms an input to a combination counter and binary converter 204 which generates a binary digital data word representative of the temperature set point data. The binary data word representative of the set point temperature is conducted through a temperature set point bus 206 for comparison with the ambient temperature data word produced by the analog to digital converter 154.

Figure 7A:
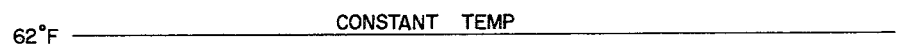
FIGS. 7A, 7B and 7C are waveforms which represent three operating modes of the digital thermostat shown in FIG. 1.
Figure 7B:
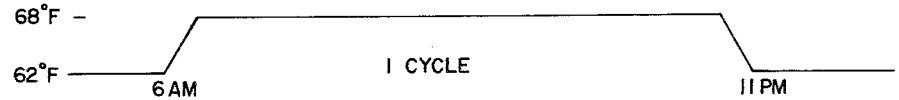
Figure 7C:
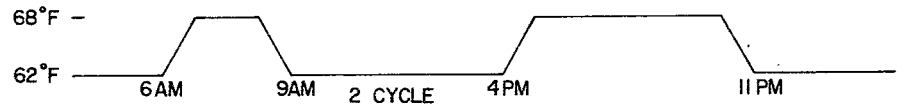

In a preferred embodiment, two additional data return conductors 172, 174 are coupled to a second time data return line 208 through diodes 210, 212, respectively. The purpose of this circuit is to provide set-back of the temperature level to an energy conserving level during a predetermined day time interval, for example during the day when the home is not occupied, with the temperature of the controlled area being regulated at a comfort level during activity intervals preceding and immediately following the day set-back interval. During the dual set-back mode of operation, the number of strobe pulses returned through all four of the time return data lines 168, 170, 172 and 174 are counted with an odd count signifying a desired transition from night temperature level to day temperature level, and an even count signifying a desired transition from day temperature level to night temperature level. With this arrangement, the temperature is controlled at a first level, for example 60° F. during nighttime until a first transition time, for example 6 a.m., in which the temperature is brought up to a comfort level, for example 68° F. until a later time in the morning, for example 9 a.m. At that time the temperature is brought back to the energy conserving level at 62° F. until 4 p.m. at which time it is raised again to the comfort level of 68° F. as shown in FIG. 7C.

Day set-back of the ambient temperature to an energy conserving level on certain days of the week can be defeated by closing one of the day skip switches 16A-16G corresponding to the desired day of the week. Referring to FIGS. 1 and 5B, certain ones of the display driver conductors in the array 136 are dedicated as day of week flag lines 214A-214F indicated generally by the reference numeral 214. These flag lines are used to convey time and temperature information during scan intervals (T2), but during display intervals (T1) one of the flag lines conducts a back plane complement signal $\overline{BP}$. The day of week flag lines are connected to the day skip switches through diodes 216A-216G. The opposite side of each day skip switch is connected in common to a day skip return line 218. The presence of the back plane complement signal $\overline{BP}$ on the day skip return line indicates that the day skip switch associated with that particular day is in the shorted or closed position and that the day set-back time information conducted through time data line 208 should be ignored.

Figure 14A:
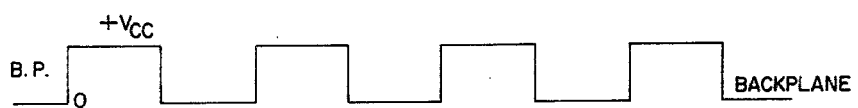
FIGS. 14A and 14B are waveforms applied to energize an element of a liquid crystal display.
Figure 14B:
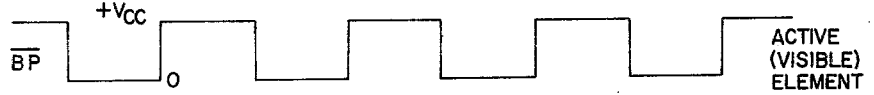
Figure 15:
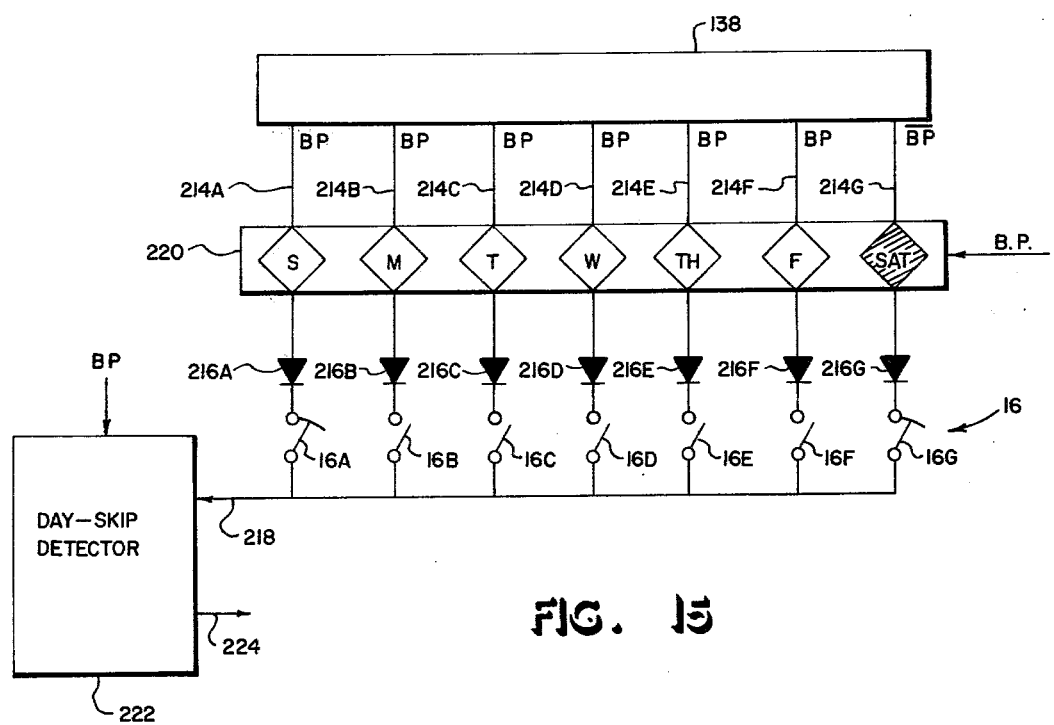
FIG. 15 is a schematic diagram of a day skipper circuit.
Figure 16A:
FIGS. 16A, 16B, 16C and 16D comprise a set of waveforms useful in understanding the operation of the day skipper circuit shown in FIG. 15.
Figure 16B:
Figure 16C:
Figure 16D:
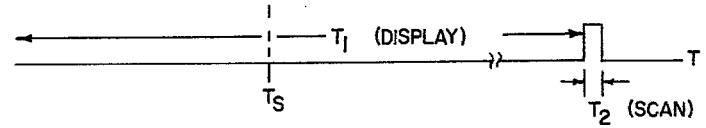

Referring now to FIG. 14A, FIG. 14B and FIG. 15, the day of week elements S, M, T, W, TH, F and SAT are superposed with respect to a back plane 220 which has a back plane signal $\overline{BP}$ applied to it which alternates between zero and $+V_{cc}$. The clock 142 and display encoder 158 cooperate to apply the back plane complement signal BP through only the day of week flag conductor of the array 214 which corresponds with the present day as determined by the clock 142. The remainder of the day of week flag conductors are driven with the back plane signal $\overline{BP}$. In the example shown in FIG. 15, the present day of the week determined by the clock 142 is Saturday and its day of week flag conductor 214G has the back plane complement signal BP applied to it so that the day of week flag element SAT is driven out of phase with the display back plane thereby rendering it visible.

Referring now to FIGS. 15 and 16A-16D, the signal appearing on the day skipper return line 218 is compared with the back plane signal BP at a sample time $T_s$ during the low voltage phase of the back plane signal BP. This comparison is carried out by a day skip detector 222. If the potential difference of the signal on the day skip return line 218 relative to the back plane signal at the time $T_s$ is zero, then the output 224 of the day skip detector is driven to a logic zero level, which means "do not skip this day". If, on the other hand, the day skip switch corresponding to the present day is in closed circuit condition, then the back plane signal BP will appear on the day skip return line 218 and when compared with the back plane signal BP at time $T_s$, a positive potential of $+V_{cc}$ relative to the back plane signal BP is detected and the output 224 is driven to a logic high condition, signifying "skip the present day".

It should be noted that the on/off condition of other day skip switches has no effect on the operation of the day skip circuit, since the back plane complement signal $\overline{BP}$ is applied to one and only one day of week flag line at any given time. For example, as shown in FIG. 15, the day skip switch 16A corresponding to Sunday is in closed circuit condition. However, the present day as indicated is Saturday so that the signal applied to the Sunday day of week flag conductor 214A is BP. The sum of the signals appearing on the Sunday day of week flag and the Saturday day of week flag at the sample time $T_s$ is equal to $+V_{cc}$, thereby indicating that the day skip switch associated with the present day is in closed circuit condition. Therefore the on/off condition of any switch other than the present day skip switch has no effect on the operation of the circuit.

The temperature set point binary converter includes a counter which is preset to binary 48 which corresponds to the lower boundary of the day and night temperature range which extends from 48° F. to 96° F. This counter is preset to binary 48 at the beginning of each temperature scan cycle. It then counts the number of pulses received through the temperature data return conductors 176, 178 and counts up so that after the last pulse has been received, and until the next temperature scan cycle, the counter registers a binary word representative of the desired set point temperature in degrees F. The set point information is renewed every two seconds in response to a clock signal (F) as shown in FIG. 5D. The temperature set point information is compared with the set point in the previous cycle by a set point change detector 226 and generates an output signal 228 which is logic zero if no change is detected and which is logic one if the set point has been changed. The logic one output of the set point change signal 228 resets the minimum on timers 128, 130 and the minimum off timers 132, 134.

Referring now to FIG. 5B, the system mode switch 18 produces a signal 106 which indicates the cooling mode when the voltage $V_{cc}$ is present, and which indicates the heating mode when a zero voltage level is present. These signals are fed into the system mode interrogator to instruct a temperature comparator 232 to perform a first temperature comparison operation. The temperature comparator 232 produces the command signal 50 in the cooling mode by comparing the set point temperature with the present ambient temperature according to the following inequality: $T_A - T_{SET} \geq K$, where $T_A$ represents the present ambient temperature, $T_{SET}$ represents the set point temperature, and K is an arbitrary temperature bias value, for example 0.5° F. According to this relation, the command signal 50 will not be generated unless the ambient temperature exceeds the set point temperature by at least 0.5° F. If the heating mode is indicated, the temperature comparator 232 performs a comparison of the set point temperature and present ambient temperature according to the following inequality: $T_{SET} - T_A \geq K$. According to this relation, the command signal 50 will be generated in the heating mode only when the present ambient temperature drops below the set point temperature by at least 0.5° F.

During each cycle, and in response to the presence of the command signal 50, the temperature differential control 236 feeds a pre-programmed digital word through its output 238 to the temperature comparator for combination with the temperature set point data word according to the selected system mode, and subject to the condition that the minimum on timer 128 is on, that is the signal 128A being in logic high condition, for either heating or cooling modes, and that the second stage start up timer signal 242 be present together with the minimum on timer 130 for the second stage being in logic high condition for the second stage heating mode. Separate differential control words are pre-programmed into the temperature differential controller 236 which correspond with the cooling mode, heating mode (first stage) and heating mode (second stage), respectively. For example, in the cooling mode, assuming the minimum on timer 128 is on, that is signal 128A is logic high, and assuming the presence of the command signal 50 in the logic high condition, the temperature differential control 236 will deliver a pre-programmed digital data word representative of a bias temperature $\Delta T_1$ for combination with the temperature set point data word for comparison by the temperature comparator with the measured temperature. The system mode switch 18 cooperates with the system mode interrogator to instruct the temperature comparator 232 to perform a second temperature comparison operation as follows: $T_{SET} - T_A \geq \Delta T_1$. The command signal 50 remains in logic high condition until this second inequality comparison is satisfied. The comparator 232 makes a similar comparison for different $\Delta T$ values for the first and second stage heating modes.

The result of the temperature comparator operation is the command signal 50 which is applied to the minimum off timer 132 of the first stage. The temperature comparator 234 generates a second stage command signal 51 which is applied to the minimum off timer 134 for the second stage. A second stage start up timer 240 receives the command signal 50 and generates a second stage start up enable signal 242 after a predetermined count following the application of the first stage command signal 50.

The system mode interrogator 230 has a gate drive enable output 244 and a heat/cool output signal 246. The gate drive enable signal 244 is logic one for either heat or cool positions of the mode switch 18 and generates a logic zero output signal in response to the off position of the mode switch 18. The heat/cool signal 246 is driven to logic one in the heat position of the mode switch and is driven to logic zero in response to the cool position of the system mode switch. In response to the logic one condition of the heat/cool signal 246, the temperature comparator 232 subtracts the present ambient temperature conducted through the data bus 156 from the set point temperature conducted through data bus 206 which yields a positive result when the ambient temperature is less than the temperature set point by at least a predetermined temperature differential $\Delta T$. The presence of a logic zero signal on the heat/cool signal line 246 instructs the temperature comparator to subtract the set point temperature from the present ambient temperature to yield a positive result equal to or greater than $\Delta T$, which indicates that the Triac switch 46 should be turned on, subject to the minimum-off timer constraints.

The minimum-off timers 132, 134 are programmable in one minute intervals from two minutes to fifteen minutes. When the command signal 50 from the temperature comparator 232 goes to a logic low, the minimum-off timer 132 starts counting and clamps the timer output to logic low during the programmed interval. If the command signal from the comparator goes to logic high condition during this interval, it will not be transmitted through the minimum-off timer until the programmed interval has elapsed, at which time the clamp is released. If the command signal from the comparator 232 goes to a logic high condition after the interval has elapsed, it is transmitted through the minimum-off timer without delay. When the output signal 228 of the set point change detector 226 is driven to a logic high condition, the minimum-off timer 132 is reset but is not restarted.

The minimum-on timers 128, 130 are preferably programmable in one minute intervals from two minutes to fifteen minutes. When the command signal 50 is received from the temperature comparator 232, and no inhibited by the minimum-off timer signal 132A, the minimum-on timer output 128A is driven to a logic high condition and stays in logic high condition during the programmed interval, even if its input subsequently is driven to logic low condition. The minimum-on timer can also be started by the presence of the Triac switch fail detector signal 124A. A logic high signal from the set point change detector 226 will reset the minimum-on timer and allow it to restart if its input 132A is still in logic high condition.

When the gate drive enable signal 244 is driven to a logic high condition, the gate drivers 62, 63 are enabled to transmit a gate pulse through the timed gates 58 and 59, respectively.

The second stage start-up timer 240 is programmable in five minute intervals up to one hour and will turn on the second stage Triac switch 66 when the first stage Triac switch 46 has been on for at least the programmed interval. The second stage start-up timer 240 is reset whenever the first stage turns off.

A low voltage power transfer circuit 248 compares the regulated voltage by an auxiliary battery 250. If the battery potential is higher, then battery power will be delivered to the control module 44.

It will be observed that the digital thermostat 10 of the present invention can be substituted for a conventional electro-mechanical thermostat on a wire-for-wire basis without modification of an existing low voltage control heating or cooling system. Other variations of the foregoing circuits will be apparent to those skilled in the art in view of the above disclosure to provide different time temperature regulation and temperature setback as desired. The data display elements are preferably liquid crystal elements and the counting and logic circuits are preferably CMOS thereby providing extremely low power consumption which enables it to be operated for a relatively long period of time from the auxiliary battery, or from the system control relay circuit without affecting operation of the system control relay.

Because of its set-back features, it can easily be set to operate as a continual night set-back thermostat or at a day-skip temperature setting for any one, two or up to all seven days of the week. Its versatility makes it ideal for use in the small office and shop where skipping weekend days is important. For the weekend cabin installation, it can turn on heat or air conditioning to bring the ambient temperature up to a comfort level by a programmed arrival time. Because of its day set-back feature, the temperature can be reduced to an energy conserving low during the day when the home is not occupied, as well as providing night set-back to an energy conserving level. In this operating mode, the thermostat 10 will turn on the heat or air conditioning in the dwelling in the morning, and set back the temperature during the day and then bring it back up to a comfort level during the evening. The day skipper switch circuit will cause either skipping of selected days during single cycle operation or will prevent daytime set-back during dual cycle operation. Through the action of the day skipper switches, the daytime set-back can be inhibited on Saturday and Sunday or on any other day that the dwelling is expected to be in use.

Although a preferred embodiment of the invention has been described in detail, it should be understood that various changes, substitutions and alterations can be made therein without departing from the spirit and scope of the invention as defined by the appended claims.

What is claimed is:

1. In a digital thermostat having a plurality of liquid crystal display elements, a data transmission circuit for generating a plurality of data signals representative of alphanumeric data, and a plurality of driver conductors interconnecting the data transmission circuit with the liquid crystal display elements, the combination of a control circuit coupled to said data transmission circuit for applying the data signals to the display elements during a display interval and for periodically interrupting the data signals during time and temperature scan intervals, each scan interval having a duration which is less than the turn-off time of the liquid crystal display elements; a strobe circuit coupled to said driver conductors for pulsing the driver conductors during the scan intervals with an electrical strobe signal having a pulse duration less than the turn-on time of the liquid crystal display elements; time and temperature set point data return conductors coupled to selected ones of the driver conductors for conducting night-to-day transition, day-to-night transition, day temperature and night temperature data return signals, respectively, in response to the application of a strobe pulse to the corresponding driver conductors; and a counting circuit coupled to said strobe circuit and to said set point data return conductors for counting the number of strobe pulses returned through the time set point return conductors during the time scan interval commencing with the first application of a strobe pulse to a driver conductor and terminating with the application of the Nth strobe pulse to a driver conductor, N being the number of present time resolution intervals elapsed since a predetermined reference time, and for counting the number of strobe pulses occurring during the temperature scan interval commencing with the first application of a strobe pulse to a driver conductor and terminating upon the application of a strobe pulse to the driver conductor coupled to the day temperature return conductor in response to a count during the time scan indicating the occurrence of a night-to-day transition, and terminating upon the application of a strobe pulse to the driver conductor coupled to the night temperature return conductor in response to a count during the time scan indicating the occurrence of a day-to-night transition.

2. The combination as defined in claim 1 including:
first and second day set-back time set point data return conductors each coupled to a selected one of said display driver conductors for conducting day set-back interval initiation and termination signals, respectively, in response to the application of a strobe pulse to the corresponding driver conductors;
an array of day-of-week indicator elements each coupled to one of the driver conductors for receiving back plane and back plane complement signals during the display interval with the back plane complement signal being applied only to the indicator element corresponding with the present day;
an array of day skip switches coupled to each day-of-week element for selectively gating the back plane or back plane complement signal applied to selected day-of-week elements when the corresponding day skip switch for the selected day-of-week element is in closed circuit condition;
a day skip detector circuit coupled to said day skip switches for comparing the resultant of all signals conducted through said switches with the back plane signal at a predetermined sample time during the display interval, said detector having a logic one output indicating an out-of-phase relationship and a logic zero output indicating an in-phase relationship of the back plane signal and the resultant signal; and,
means coupled to said counting circuit for inhibiting and enabling the count of a return pulse transmitted through either day set-back return conductor in response to a logic one and a logic zero output condition in the day skip detector circuit, respectively.

3. The digital thermostat as defined in claim 1, including a movable switch element electrically connecting each data return conductor to a selected one of said driver conductors, the position of each movable switch element being manually settable for establishing a discrete electrical connection between the switch element and a selected one of said driver conductors.

4. A digital thermostat for automatically controlling the operation of heat transfer apparatus in which the thermostat cycles the heat transfer apparatus on and off to maintain the ambient temperature within an enclosure substantially equal to a first predetermined temperature during a first time interval and substantially equal to a second predetermined temperature during a second time interval, said thermostat comprising, in combination:
a temperature responsive transducer for generating an analog signal proportional to the ambient temperature of the enclosure;
converter means coupled to said transducer for generating a plurality of data signals defining a first digital data word representative of the analog temperature signal;
an electro-optical display including a plurality of indicator elements arranged for separately indicating an alphanumeric character during a display interval;
a plurality of driver conductors interconnecting said converter means and said electro-optical display for applying the data signals to said display elements during a display interval;
first and second time set point data return conductors each coupled to a selected one of said display driver conductors for conducting night-to-day and day-to-night transition set point signals, respectively, in response to the application of a strobe pulse to the corresponding driver conductor;
first and second temperature set point data return conductors each coupled to a selected one of said display driver conductors for conducting day temperature and night temperature set point signals, respectively, in response to the application of a strobe pulse to the corresponding driver conductor;
control means coupled to said electro-optical display for periodically applying the data signals to said display during the display interval and interrupting the data signals during a scan interval following the display interval;
a strobe generator coupled to said driver conductors for pulsing said driver conductors during said scan interval;
a first counting circuit coupled to said time set point data return conductors for counting the number of strobe pulse return signals conducted through said time set point data return conductors during the time set point scan interval commencing with the first applicaton of a strobe pulse to a driver conductor and terminating upon the application of the Nth strobe pulse to a driver conductor, N being the number of present time resolution intervals elapsed since a predetermined reference time;
a second counting circuit coupled to said temperature set point data return conductors and to said first counting circuit for generating a temperature set point digital data word representative of the number of strobe pulses occurring during the temperature set point scan interval commencing with the first application of a strobe pulse to a driver conductor and terminating upon the application of a strobe pulse to the driver conductor engaged in electrical contact with the day temperature data return conductor in response to a count of the first counting circuit indicating the occurrence of a night-to-day transition, or to the driver conductor engaged in electrical contact with the night temperature data return conductor in response to a count of the first counting circuit indicating the occurrence of a day-to-night transition; and, a comparator circuit coupled to said first and second counting circuits for receiving the data bits of the ambient temperature data word and the set point temperature data word, respectively, and coupled to said heat transfer apparatus for cycling said heat transfer apparatus on or off in response to a predetermined comparative relation of the ambient temperature data word relative to the set point temperature data word.

5. The digital thermostat as defined in claim 4, said display indicator elements characteristically exhibiting a turn-on delay time and a turn-off delay time in response to the application and interruption of an energizing signal, respectively, said scan intervals being substantially shorter in duration as compared to the duration of the display interval and having a duration less than the turn-off time, said strobe pulses having a duration less than the turn-on time.

6. The digital thermostat as defined in claim 5, said display indicator elements comprising a liquid crystal material.

7. In a thermostatic control unit for use with a heating or cooling system which includes a source of operating power characterized by an alternating current waveform and a system control relay connected in series electrical relation therewith, a power divider circuit for energizing and de-energizing said system control relay in response to the presence and absence of a command signal, respectively, and for providing a continuous source of operating power for said thermostatic control unit without interfering with the operating state of said system control relay, said power divider circuit comprising:

a semiconductor switch characterized by a holding current threshold level having a gate and a controlled conductive path through which conduction is initiated by a gate signal, sustained by forward or reverse current flow through said conductive path within said holding current threshold level and interrupted by an excursion of said alternating current waveform outside of said holding current threshold level, said conductive path having nominal anode and cathode terminals for connection in series electrical relation with said system control relay and said alternating current source;

a power converter circuit connected in parallel electrical relation with said switch for continuously developing regulated direct current power either in response to the conduction of current from said system control relay through said converter circuit during a full cycle of the alternating current waveform or in response to the conduction of current from said system control relay through said converter circuit during only a fraction of a cycle of said alternating current waveform;

a sync circuit coupled to said switch for generating an output pulse in response to a zero crossover of the source alternating current waveform appearing at the nominal anode terminal of said switch when said conductive path is in the open circuit condition; and, a gate control circuit coupled intermediate said sync circuit and the gate of said switch for producing a delayed gate signal in response to said sync output pulse and for conducting said delayed gate signal through the gate of said switch in response to the presence of said command signal, the conductive path being in the open circuit condition during the absence of the command signal and being in the open circuit condition during the interval commencing with the turn-off of said switch responsive to an excursion of the source current waveform outside of the holding current threshold level and terminating with the initiation of conduction in said switch in response to the application of a delayed gate signal to the gate of said switch.

8. In an automatic thermostat of the type having a programmable switch circuit for cycling heat transfer apparatus on and off, the improvement comprising:

a system mode interrogator for generating a signal representative of the selected system mode;

a temperature comparator circuit for performing the comparative relation operations $(T_A - T_{SET})$ or $(T_{SET} - T_A)$ and for generating a turn-on command signal when either one of the following comparative relations is satisfied:

$T_A - T_{SET} \geq K_1$ in response to a mode signal indicating the cooling mode, $T_{SET} - T_A \geq K_2$ in response to a mode signal indicating the heating mode;

a timing circuit responsively coupled to the programmable switch and to the temperature comparator for enabling the transmission of the turn-on command signal after the elapse of a predetermined minimum-off interval following the generation of the turn-on command signal; and, a temperature differential control unit coupled to the temperature comparator to carry out the following operations in response to the presence of the turn-on command signal and to the enabling condition of the minimum-off timer:

$T_A - T_{SET} \geq \Delta T_1$, in response to a mode signal indicating the heating mode, and $T_{SET} - T_A \geq \Delta T_2$, in response to a mode signal indicating the cooling mode, the turn-on command signal being terminated when either of the latter comparative relations are satisfied, wherein $K_1$, $K_2$, $\Delta T_1$, and $\Delta T_2$ are arbitrary temperature bias values, and $T_A$ = ambient temperature, $T_{SET}$ = set point temperature.

* * * * *